US006006148A

United States Patent [19]

Strong

[11] Patent Number: 6,006,148

[45] Date of Patent: Dec. 21, 1999

[54] AUTOMATED VEHICLE RETURN SYSTEM

[75] Inventor: Jonathan D. Strong, Rittman, Ohio

[73] Assignee: Telxon Corporation, Akron, Ohio

[21] Appl. No.: 08/871,878

[22] Filed: Jun. 6, 1997

[51] Int. Cl.$^{6}$ .............................. G06F 19/00; G08B 5/22

[52] U.S. Cl. ................................................ 701/33; 705/13

[58] Field of Search .................................. 761/1, 29, 32, 761/33, 35; 340/438, 450.2, 457.4; 307/10.1; 705/13, 34, 417, 418

[56] References Cited

U.S. PATENT DOCUMENTS

| | | | |
|---|---|---|---|
| 3,665,397 | 5/1972 | Di Napoli et al. | 340/147 R |
| 4,188,618 | 2/1980 | Weisbart | 340/201 R |
| 4,251,865 | 2/1981 | Moore et al. | 364/200 |
| 4,373,116 | 2/1983 | Shimizu et al. | 179/1 SM |
| 4,398,172 | 8/1983 | Carroll et al. | 340/38 P |
| 4,504,756 | 3/1985 | Amano et al. | 310/168 |
| 4,533,871 | 8/1985 | Boetzkes | 324/207 |
| 4,641,523 | 2/1987 | Andreasson | 73/313 |
| 4,738,133 | 4/1988 | Breckel et al. | 73/117.3 |
| 4,797,948 | 1/1989 | Milliorn et al. | 455/54 |
| 4,933,852 | 6/1990 | Lemelson | 364/424.03 |
| 4,965,821 | 10/1990 | Bishop et al. | 379/91 |
| 5,058,044 | 10/1991 | Stewart et al. | 364/551.01 |
| 5,289,369 | 2/1994 | Hirshberg | 705/13 |
| 5,422,624 | 6/1995 | Smith | 340/438 |
| 5,442,553 | 8/1995 | Parrillo | 364/424.04 |
| 5,635,693 | 6/1997 | Benson et al. | 235/384 |
| 5,758,300 | 5/1998 | Abe | 701/33 |

*Primary Examiner*—Michael J. Zanelli

*Attorney, Agent, or Firm*—Amin, Eschweiler & Turocy, LLP

[57] ABSTRACT

An automated vehicle return system wherein status information of a rented vehicle is automatically tracked during the rental period and is transmitted to a selected destination computer upon driving the vehicle into a return area. Electronic vehicle monitoring circuitry is tied to existing components within the vehicle to keep track of the status of the vehicle during the rental period. The status information includes, miles driven, fuel level, pick up time, drop off time, wear and tear on the vehicle, etc. The status information is used by the destination computer to generate a bill for the rented vehicle.

47 Claims, 9 Drawing Sheets

AUTOMATED VEHICLE RETURN SYSTEM

TECHNICAL FIELD

The present invention relates generally to an automated vehicle return system, and in particular to a vehicle return system utilizing wireless communication to exchange information related to a returned vehicle.

BACKGROUND OF THE INVENTION

In the modern era, the need and desire to travel for business as well as pleasure has increased significantly. With growing global business pressures, individuals are often asked by companies and firms to travel on short one or two day trips to handle immediate business needs. The increased travel has made the need for efficient air and ground transportation essential. For instance, recent trends in the airline industry has lead to ticketless travel which reduces the transactional time it takes to obtain and present a paper ticket when flying. With respect to ground transportation, car rental establishments have continued to attempt to improve the pick-up and drop-off procedures to minimize unnecessary delays.

Although current car rental drop off procedures are fairly effective, there are still several delays and/or costs which have not been overcome. For instance, upon returning a vehicle an individual must write down or memorize the current mileage and fuel level and then enter the car rental establishment so that an attendant can properly calculate the final cost and print a receipt. This, of course, often leads to delays and inaccuracies in the return. To save time and improve reliability, some car rental establishments employ workers to wait outside for car returns and then have the employee physically check the mileage and fuel level of the returned car. Then, using a wireless portable computer, this information is instantaneously sent to the computer of the attendant inside the rental establishment so that the customer can quickly obtain his/her receipt. Although more efficient, this situation results in increased labor and equipment costs which are ultimately passed along to the customer.

Thus, what is needed is an improved vehicle return system which overcomes the shortcomings discussed above.

SUMMARY OF THE INVENTION

The present invention is related to an automated vehicle return system wherein status information of a returned vehicle is automatically tracked and transmitted to a selected destination computer upon driving the vehicle into a return area. More particularly, electronic vehicle monitoring circuitry is tied to existing components within a vehicle to keep track of the status of the vehicle during a rental period. The status information includes, miles driven, fuel level, pick up time, drop off time, wear and tear on the vehicle, etc.

According to one aspect of the invention, upon entering a vehicle return area, a base station wirelessly polls the vehicle monitoring circuitry for the status information the vehicle monitoring circuitry has stored. As the vehicle monitoring circuitry also has wireless capabilities, it responds to the base station with the status information requested which, for example, consists of the number of miles driven and current fuel tank level. The information transmitted to the base station is then routed to a destination computer such as a computer inside the car rental building where the customer may pick up his/her receipt or to a computer on an airport shuttle bus which can also be used to print out a receipt or otherwise finalize the customer transaction related to the vehicle drop-off. With the use of this automated vehicle return system, the added time and/or costs associated with obtaining and processing the mileage, fuel tank information, and other data from a returned vehicle is minimized.

In accordance with one particular aspect of the present invention, an automated vehicle return system is provided, including: a wireless transmitter which may be coupled to a vehicle, the transmitter operative to transmit data relating to the status of the vehicle; and at least one base station positioned within a geographic region representing a vehicle return zone, the at least one base station including a receiver for receiving the data transmitted by the vehicle when the vehicle enters the vehicle return zone; wherein the at least one base station forwards the received data to a host computer which is operative to process the data.

According to another aspect of the invention, a vehicle monitoring circuit is provided, including: a processor; a memory coupled to the processor; an RF circuit coupled to the processor, the RF circuit including a transceiver for transmitting and receiving wireless communication; wherein the vehicle monitoring circuit is coupled to vehicle components, the vehicle monitoring circuit operative to collect vehicle data via the vehicle components and wirelessly transmit the vehicle data to a destination device.

Another aspect of the invention involves a method of returning a rented vehicle, including the steps of: driving the vehicle to a predetermined location; using vehicle monitoring circuitry engaged with the vehicle to assimilate data relating to the vehicle; using the vehicle monitoring circuitry to wirelessly transmit the data relating to the vehicle to a base station; forwarding the vehicle data to a host computer; and processing the vehicle data.

In accordance with another aspect of the invention, an automated vehicle return system is provided, including: a wireless transmitter which may be coupled to a vehicle, the transmitter operative to transmit data relating to the status of the vehicle; and at least one host computer positioned within a geographic region representing a vehicle return zone, the at least one host computer including a receiver for receiving the data transmitted by the vehicle when the vehicle enters the vehicle return zone; wherein the at least one host computer is operative to process the data.

According to yet another aspect of the invention an automated vehicle return system is provided, including: a first transmitter coupled to a vehicle, the first transmitter operative to wirelessly transmit data relating to the status of the vehicle; and at least one receiver positioned within a geographical region representing a vehicle return zone, the at least one receiver receiving the data transmitted by the first transmitter when the vehicle is within the vehicle return zone; wherein the receiver is coupled to a vehicle return processing device which is operative to process the data.

Still another aspect of the invention involves a vehicle return circuit, including: status circuitry, the status circuitry capable of monitoring one or more vehicle conditions related to at least one of mileage information and fuel level information; and a wireless transmitter coupled to the status circuitry, the wireless transmitter operative to transmit data related to the vehicle conditions;

In accordance with yet another aspect of the invention an automated vehicle return system is provided, including: a transmitter for transmitting a wireless signal within a geographic region representing a vehicle return zone; and a receiver coupled to vehicle monitoring circuit of a vehicle, wherein the vehicle monitoring circuit receives the wireless signal via the receiver upon entering the vehicle return zone.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
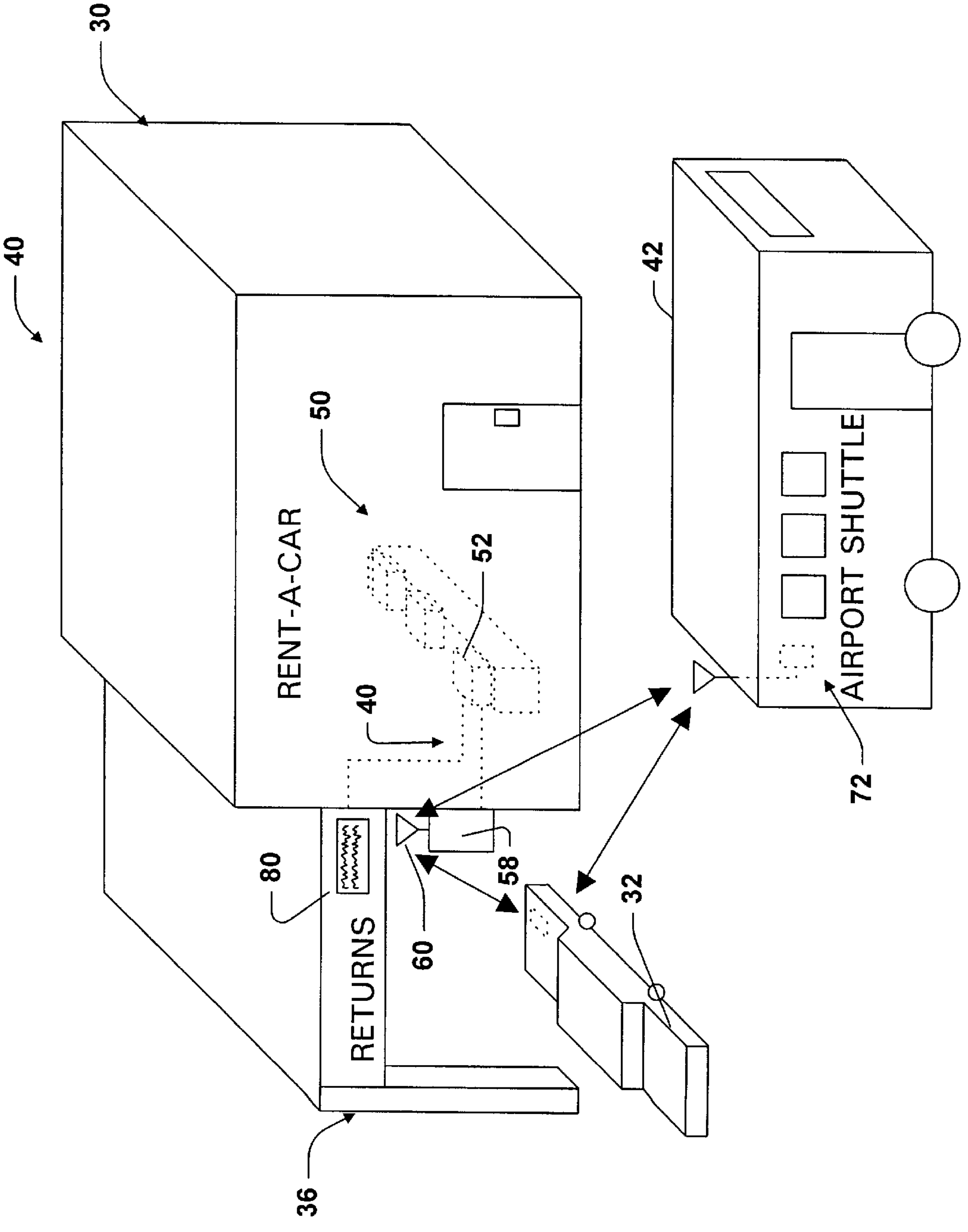
FIG. 1 is a system diagram of an automated vehicle return system in accordance with the present invention.

The present invention will now be described with reference to the drawings, wherein like reference numerals are used to refer to like elements throughout.

As is mentioned above, the present invention relates to an automated vehicle return system wherein status information of a returned vehicle is automatically tracked and transmitted to a selected destination computer upon driving the vehicle into a return area. More particularly, electronic vehicle monitoring circuitry is tied to existing components within a vehicle to keep track of the status of the vehicle during a rental period. The status information includes, miles driven, fuel level, pick up time, drop off time, emergency warning lights activated, wear and tear on the vehicle, etc.

Turning now to FIG. 1, an automated vehicle return system 30 is shown in accordance with an exemplary embodiment of the present invention. The return system 30 shows a vehicle 32 being driven into a return garage 36 of a car rental agency 40. Also shown is a shuttle bus 42 which may be used to transport a rental customer to an airport (not shown) after having dropped off the vehicle 32.

The rental agency 40 is shown to have a series of networked cash registers 50 (shown in phantom) which are coupled to a host or central computer 52 via hardwired cables to form a network backbone 54. The network backbone 54 may be a hardwired data communication path made of twisted pair cable, shielded coaxial cable or fiber optic cable, for example, or may be wireless or partially wireless in nature. Coupled to the network backbone 54 are the cash registers 50 and a base station 58. The base station 58 is shown externally mounted to a wall of the rental agency 40. Only one base station 58 is shown hardwired to the network backbone 54, however, it is understood that more than one hardwired base station 58 may be physically connected to the network backbone 52. The base stations 58 may be hardwired to the network backbone 54 or may wirelessly couple to the network backbone 54. Each base station 58 serves as an entrance point through which wireless communications may occur with the network backbone 54. The wireless base station 58 may be employed to expand the effective communication range of the vehicle return system 30.

The base station 58 includes an antenna 60 through which it can wirelessly communicate with other wireless devices in the return system 30. For instance, the base station 58 may be used to communicate with vehicle monitoring circuitry 70 (FIG. 7) which is engaged with the returned vehicle 32. Alternatively, the base station 58 may wirelessly communicate with a computer 72 inside the shuttle bus 42.

It will be appreciated that any suitable number of base stations 58 may be employed to carry out the present invention. Each base station 58 is capable of wirelessly communicating with other devices in the system 30 via respective antennas 60. The antenna 60 for any particular device may be of any type suitable for use in a wireless communication system, such as an omni-directional antenna, a yagi-type antenna, etc. A geographic cell (not shown) associated with each base station 58 defines a zone (i.e., region) of coverage in which successful wireless communications may occur. Depending on the type of antenna 60 selected and output power of the respective base station 58, the geographic cell may take one of several different forms and sizes. For example, the antenna 60 could be an omni-directional antenna if a generally spherical cell area of coverage is desired. A directed yagi-type antenna could be used as the antenna 60 for a more directed elliptical cell area of coverage.

It is noted that although the connection between the computer 52 and other devices are shown to be hardwired connections, the connections could be wireless in nature by use of radio frequency or infra-red signals, for example.

In order to determine when a vehicle 32 enters the return garage 36 or surrounding area, the host computer 52 transmits a polling signal through the base station 58 at periodic intervals. The polling signal is a broadcast message directed to the vehicle monitoring circuitry 70 (FIG. 7) associated with all vehicles being returned. In order to avoid the base station accidentally polling the vehicle monitoring circuitry 70 associated with other vehicles 32 on the lot or in other areas, the transmit power level of the base station 58 is adjusted so that only vehicles 32 within a known zone of the base station 58 will receive the polling messages. The zone in which the base station 58 can reliably transmit and receive wireless communication with other devices is typically referred to as the base station's cell coverage area.

For purposes of the present embodiment, this zone may also be referred to as a vehicle return zone. In alternative embodiments described herein, the vehicle return zone is defined to include the region in which the host computer 52 or the computer 72 inside the shuttle bus 42 can directly communicate with the vehicle, in the event the base station 58 is non-existent or being by-passed. In general, the vehicle return zone includes any region in which the vehicle can wirelessly transmit information to a device which receives the information for purposes of completing, at least in part, a transaction related to returning the vehicle regardless of whether the device receiving the information is itself the device which processes or completes the transaction. The protocol associated with communication among the base station 58, the vehicle monitoring circuitry 70 and the computer 52 on the shuttle bus 42 will be described in more detail below.

Figure 2:
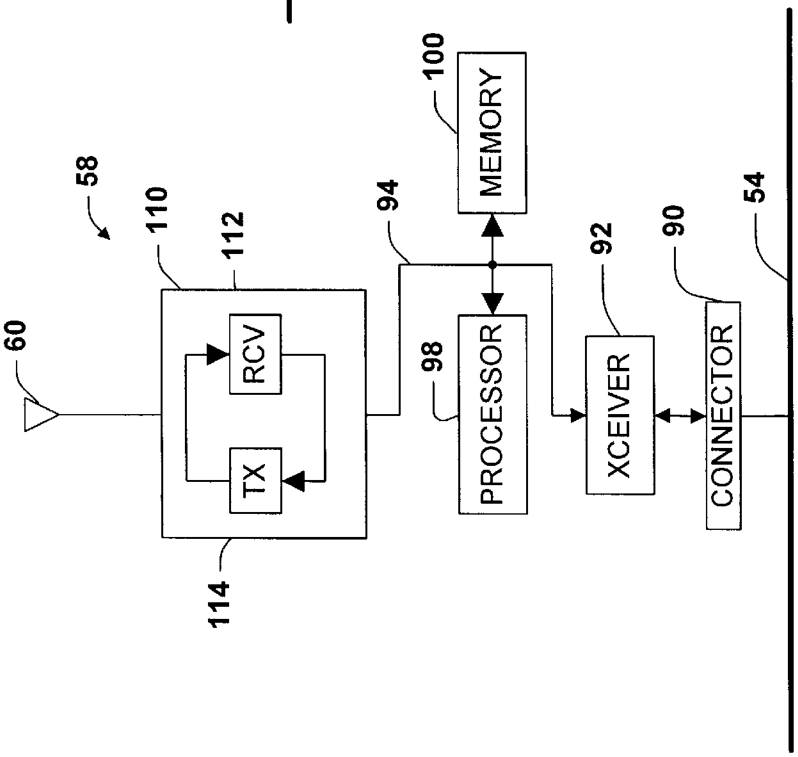
FIG. 2 is a block diagram of a hard wired base station in accordance with the present invention.

FIG. 2 is a block diagram representative of each hardwired base station 58. Each hardwired base station 58 is connected to the network backbone 54 via a connector 90 such as a DB-9 or RJ-45 connector. The connector 90 is connected to the network backbone 54 at one end and to a network adapter transceiver 92 included in the base station 58 at the other end. The network adapter transceiver 92 is configured according to conventional adapter transceiver techniques to allow the base station 58 to communicate over the network backbone 54. The network adapter transceiver 92 is also connected to an internal bus 94 included within the base station 58. The base station 58 further includes a processor 98 connected to the bus 94 for controlling and carrying out the operations of the base station 58. The processor 98 may include any of a variety of different microprocessors, such as the Motorola 68360 or Intel 80486 microprocessors. It is understood that any suitable processor capable of carrying out the herein described functions of the base stations 58 may be used and falls within the scope of this invention.

The base station 58 also includes a memory 100 connected to the bus 94. The memory 100 stores program code executed by the processor 98 for controlling the other elements within the base station 58 to carry out the functions described herein. It will be readily apparent to a person having ordinary skill in the art of microprocessor programming how to program the processor 98 to carry out the operations described herein using conventional programming techniques based on the flowcharts/flow diagrams and descriptions provided herein. Accordingly, additional detail as to the specific program code has been omitted. The memory 100 also serves to buffer packets of information such as those received over the network backbone 55 or those transmitted to or received from the vehicles 32. Furthermore, the memory 100 may store tables relating to which of the vehicles 32 have been returned to the garage 36, which vehicles are due to be returned, etc. The memory can be of any suitable form such as, for example, RAM, ROM, a hard drive, or a floppy disk drive.

Also connected to the bus 94 is a radio frequency (RF) section 110 included in the base station 58. The RF section 110 includes the aforementioned antenna 60 for receiving radio signals from and transmitting radio signals to vehicles 32 and buses 42 within the cell coverage area (i.e., zone) of the base station 58. Information transmitted from a vehicle 32 or a bus 42 is received via the antenna 60 and is processed by an RF receiver 112 which is connected to the bus 94 and demodulates and decodes the signal and converts the signal to a digital signal having a packet format as discussed below in connection with FIGS. 5 and 6. The processor 98 controls an RF transmitter 114 included in the RF section 110, the RF transmitter 114 also being connected to the bus 94. The processor 98 causes the RF transmitter 114 to modulate and transmit an RF signal which in turn carries the information packet (FIGS. 5 and 6) to the appropriate vehicle 32 or bus 42.

Figure 3:
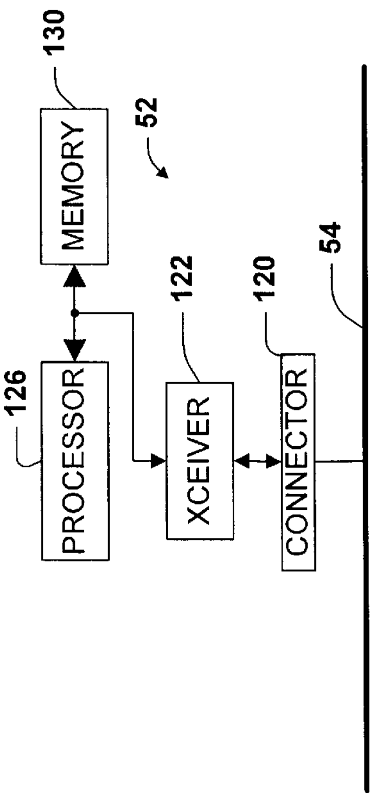
FIG. 3 is a block diagram of a host computer in accordance with the present invention.

FIG. 3 is a block diagram representative of the host computer 52 of the present invention. Although operations performed by the host computer 52 are conventionally different than the operations of a base station 58, the hardware components are similar to those hardware components described with respect to the base station 58 in FIG. 2. Hence, the function and interconnection among the hardware components will not be described again in detail. Rather, as shown in FIG. 3, similar to base station 58, the host computer 52 includes a backbone connector 120, a transceiver 122, a processor 126 and a memory 130. Unlike the base stations 58, however, the host computer 52 of this particular embodiment does not include an RF section 110. Thus, in order for the host computer 52 to communicate with any vehicle 32 or bus 42, the host computer 52 must route all such communication over the backbone 54 and through one of the base stations 58.

Similarly, for a vehicle 32 or bus 42 to communicate with the host computer 52, the vehicle 32 or bus 42 must first access the network backbone 54 through one of the existing base stations 58 which will then ensure the communication is properly delivered to the host computer 52. It will be appreciated that in this preferred embodiment, any wireless base stations 58 will likewise communicate with other devices in the system 30 via a hardwired base station 58.

The host computer 52 serves as a central unit where large operational based and application based software programs are stored and executed in order to provide the necessary functions which the system 30 was installed to perform. As will be discussed in greater detail below, the host computer 52 determines whether or not a vehicle 32 has been returned and the status of the vehicle 32. The host computer 52 makes such determination based on status information provided by the respective vehicle 32 within the system 30, and the vehicle's respective IDs and other identifying indicia (e.g., random 32 bit numbers).

Figure 4:
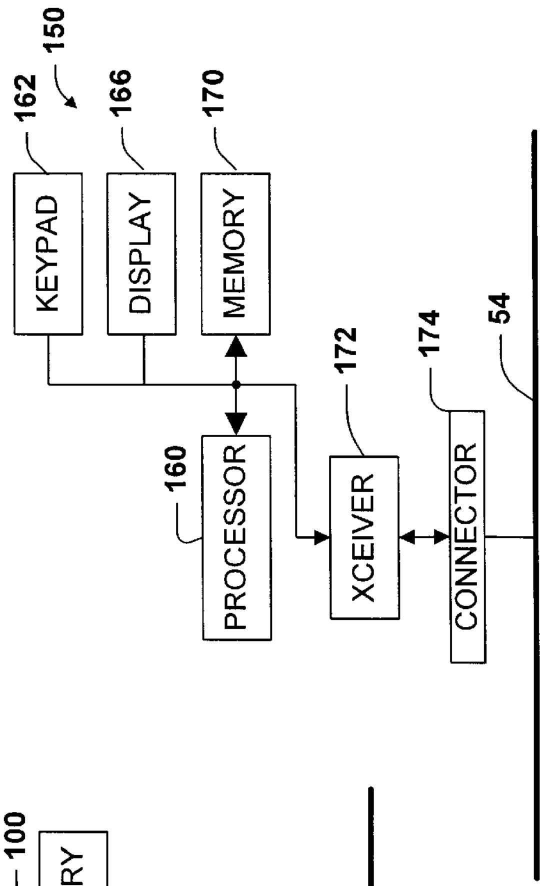
FIG. 4 is a block diagram of a cash register in accordance with the present invention.

FIG. 4 is a block diagram representing the basic structure of a cash register 150 according to an exemplary embodiment of the present invention. Each cash register 150 includes a processor 160 which can be programmed to control and operate the various components within the cash register 150 in order to carry out the various functions described herein. The processor 160 has coupled thereto a user input device 162 (e.g., keypad) which allows a user to input data to be communicated to the network backbone 54 such as vehicle inventory data, vehicle status data, customer data, etc. This information may be sent to the host computer 52 which serves as a central data location, for example. The input device 162 can include such items as a keypad, touch sensitive display, etc. A display 166 is connected to and controlled by the processor 160 via a display driver circuit (not shown). The display 166 serves as a means for displaying information stored within the cash register 150 and/or received over the network backbone 54 via a base station 54 or the host computer 52. The display 166 can be a flat panel liquid crystal display with alpha-numeric capabilities, for example, or any other type of display as will be appreciated.

A memory 170 is included in each cash register 150 for storing program code executed by the processor 160 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 170 also serves as a storage medium for storing information packets received from or intended to be transmitted to a base station 58 as discussed herein.

Similar to base station 58, each cash register 150 also includes a transceiver 172 and a backbone connector 174 for connecting to the network backbone 54.

Figure 5:
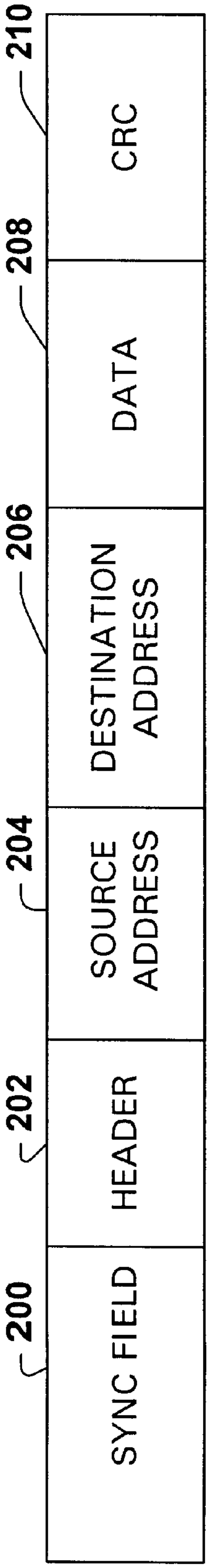
FIG. 5 is a schematic diagram representing an exemplary format for information packets which are communicated between devices in the automated vehicle return system in accordance with the present invention.
Figure 6:
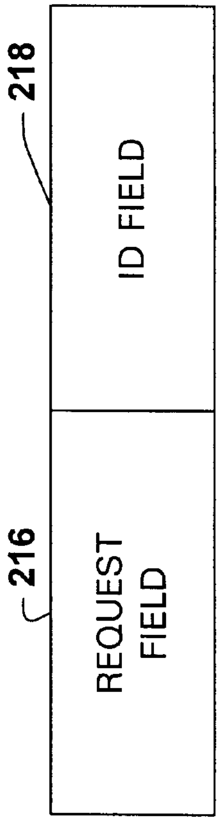
FIG. 6 is a schematic diagram representing the information found in a data field of the information packet of FIG. 5

Referring briefly to FIGS. 5 and 6 an exemplary format for packets sent between devices in the system 30 is shown. Each packet includes a number of fields such as a synchronization field 200, a header field 202, a source address field 204, a destination address field 206, a data field 208, and an error correcting field (CRC) 210, for example. The synchronization field 200 includes synchronizing bits which allow a device receiving the packet an opportunity to "sync" to the packet as is conventional. The header field 202 follows the synchronization field 200 and includes information such as the length, type of the packet and a temporary address or identification code assigned by the host computer 52.

For example, the header field 202 may indicate whether the packet is a type which requires a response from the receiving device. The source address field 204 follows the header field and includes an address of the device from which the packet originated. Following the source address field 204, the packet includes a destination address field 206 which holds the address of the device to which the packet is ultimately destined. The data field 208 in the packet includes various information (see FIG. 6) intended to be communicated to the receiving device. The packet ends with a cyclical redundancy code (CRC) field 210 which serves as an error correcting field according to conventional techniques such that a receiving device can determine if it has properly received the packet.

FIG. 6 illustrates in greater detail the information contained in the data field 208 of packets transmitted from vehicles 32 to base stations 58. The data field 208, includes a request type field 216 which identifies the type of request being made by the vehicle 32 to the destination device. For example, the request type field 216 may indicate that an initial session request is being made, or a final session request is being made, etc. The data field 208 also includes a device ID field 218 which contains an identification code (e.g., 32-bit random number) for the particular vehicle 32. The 32-bit random number, in addition to the identification code in the header field 202, further identifies and distinguishes the vehicle 32 to the network backbone 54 with respect to other vehicles 32 within the communication system 30. It will be appreciated that the vehicle identification number (VIN) may also be used by the system for identifying vehicles 32.

Figure 7:
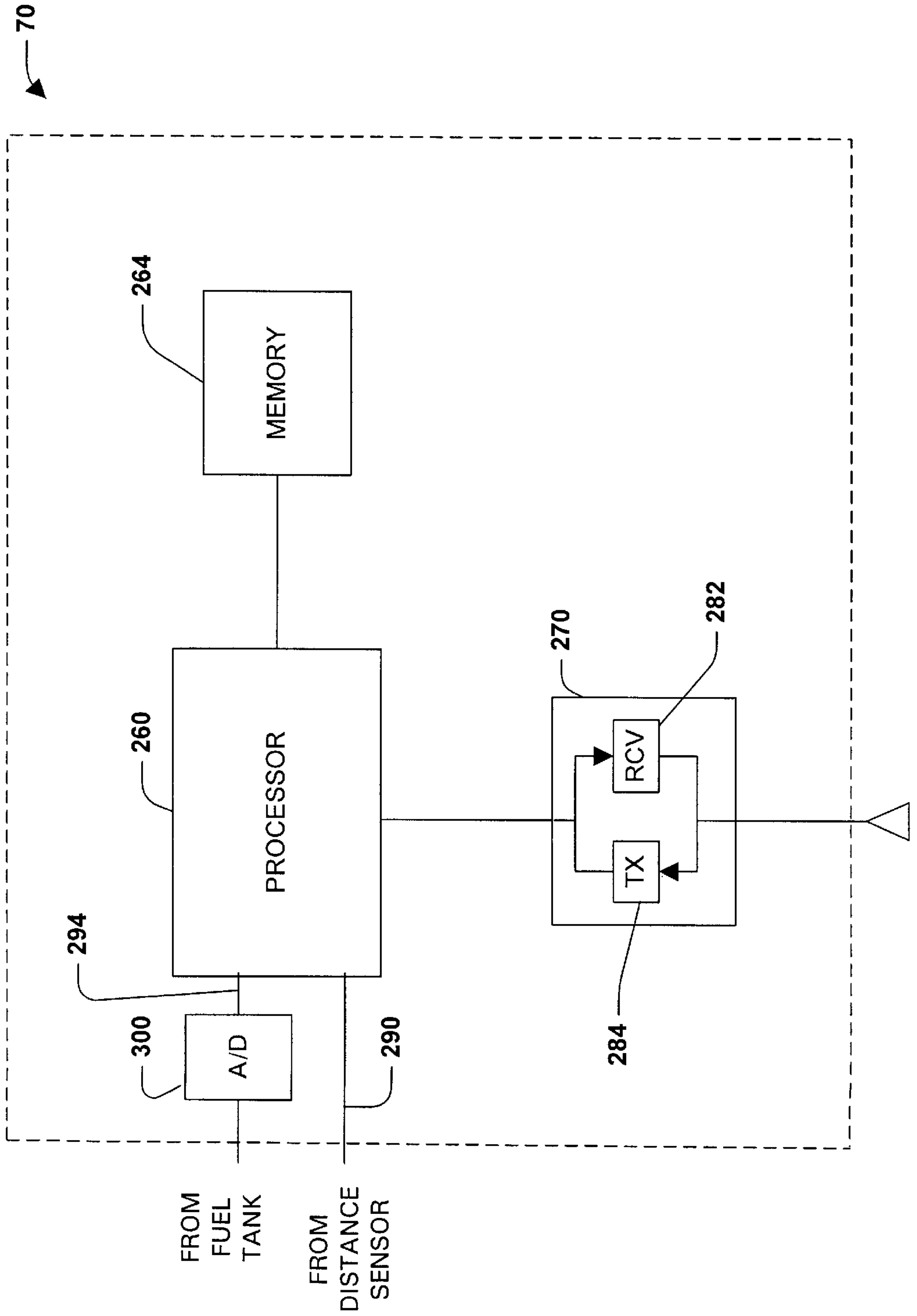
FIG. 7 is a block diagram of a vehicle monitoring circuit in accordance with the present invention.

Turning now to FIG. 7, the vehicle monitoring circuit 70 is shown in block diagram. The vehicle monitoring circuit 70 includes a processor 260 for controlling and carrying out the operations of the base station 58. The processor 260 may include any of a variety of different microprocessors, such as the Motorola 68360 or Intel 80486 microprocessors. It is understood that any suitable processor capable of carrying out the herein described functions of the monitoring circuit 70 may be used and falls within the scope of this invention.

The monitoring circuit 70 also includes a memory 264 coupled to the processor 260. The memory 264 stores program code executed by the processor 260 for controlling the other elements within the monitoring circuit 70 to carry out the functions described herein. It will be readily apparent to a person having ordinary skill in the art of microprocessor programming how to program the processor 260 to carry out the operations described herein using conventional programming techniques based on the flowcharts/flow diagrams and descriptions provided herein. Accordingly, additional detail as to the specific program code has been omitted. The memory 264 also serves to buffer packets of information such as those received over the network backbone 54 or those transmitted to or received from the base station 58. Furthermore, the memory 264 may store status information (e.g., time and date returned, fuel level, mileage, wear and tear, etc.) of the vehicle 32.

Also connected to the processor 260 is a radio frequency (RF) section 270 included in the monitoring circuit 70. The RF section 270 includes an antenna 280 for receiving radio signals from and transmitting radio signals to base stations 58 and/or buses 42 within the cell coverage area of the vehicle 32. Information transmitted from a base station 58 or a bus 42 is received via the antenna 280 and is processed by an RF receiver 282 which demodulates and decodes the signal and converts the signal to a digital signal having a packet format as discussed above in connection with FIGS. 5 and 6. The processor 260 controls an RF transmitter 284 included in the RF section 270, the RF transmitter 284 also being connected to the processor 260. The processor 260 causes the RF transmitter 284 to modulate and transmit an RF signal which in turn carries the information packet (FIGS. 5 and 6) to the appropriate base station 58 or bus 42.

Figure 8:
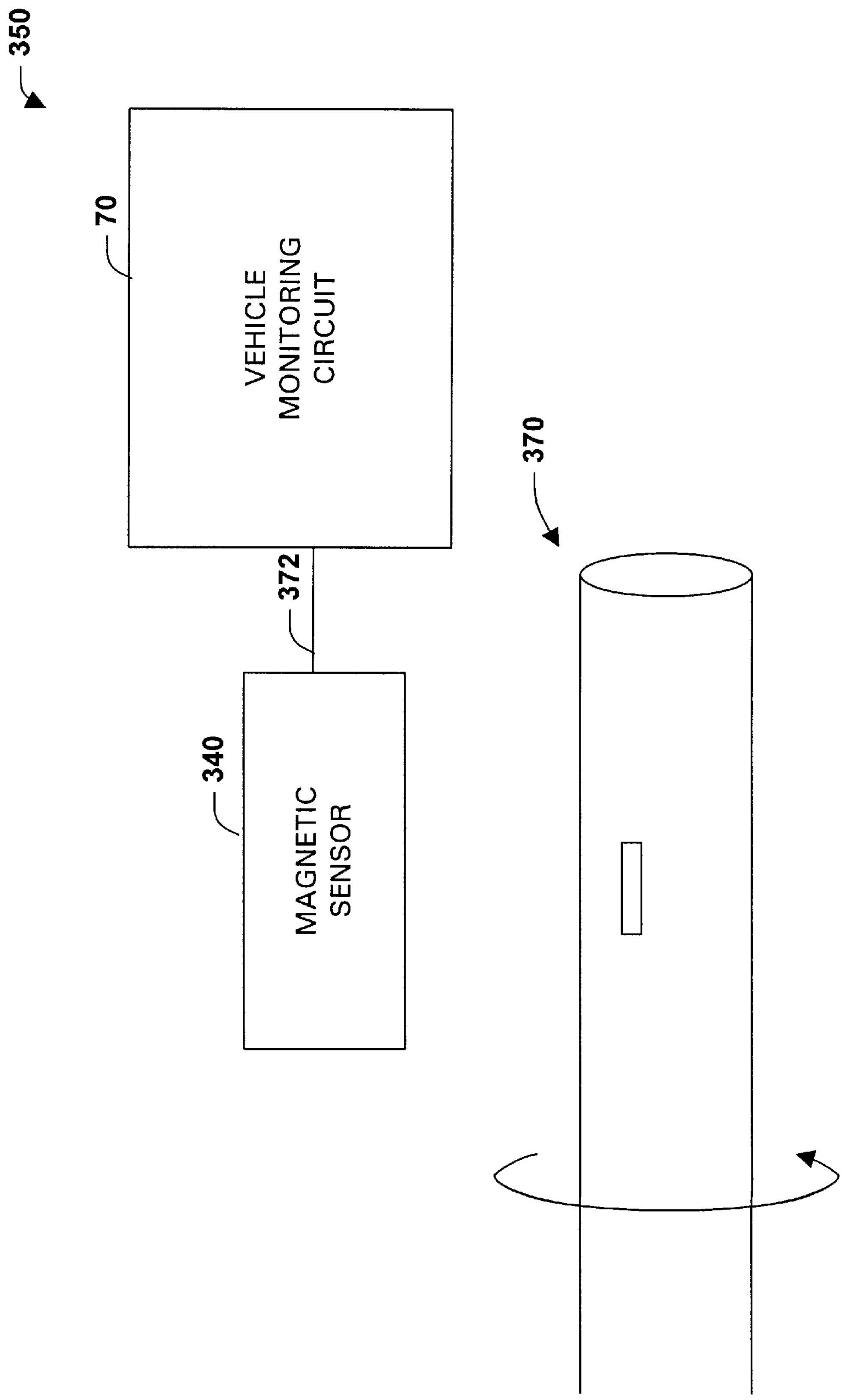
FIG. 8 is a block diagram of a mileage sensor circuit in accordance with the present invention.

Entering the processor 260 via line 290 is a digitally pulsed signal from a magnetic sensor (FIG. 8). This signal may be used by the processor 260 to keep track of distance traveled and/or the speed the vehicle 32 is traveling at any given time as discussed in greater detail below. Conversions from the number of pulses received to actual distance is calculated by the processor 260 based on a preprogrammed conversion factor. A fuel level signal is input to the processor 260 via line 294 from an analog-to-digital (A/D) converter 300. Since the fuel level signal is directly proportional to the amount of fuel in the gas tank 320 (FIG. 9), the processor 260 can perform a known conversion via a preprogrammed equation or a look up table to determine the amount of fuel left in the gas tank 320. Alternatively, the processor 260 may simply store the raw values obtained from both the fuel level monitoring apparatus and circuit 330 and the magnetic sensor 340 and wirelessly pass this data on to the host computer 52 or other device where the actual conversions can take place.

Turning now to FIG. 8, a mileage sensor circuit 350 is shown. In the preferred embodiment, the mileage sensor circuit 350 consists of a magnetic signal sensor 340 which senses the rotations of a shaft 370 in an electrical speed sensor assembly (now shown) such as that described in U.S. Pat. No. 4,504,756 ('756), which is hereby incorporated by reference. It is noted that any other suitable mileage and/or distance sensor could also be use such as, for example, an optical transducer, magnetic transducer, etc. As discussed in the '756 patent, the shaft 370 is adapted to be interconnected to an output shaft of a vehicle transmission and is used in conjunction with the electrical speed sensor assembly to produce an electrical signal which can be used to measure vehicle speed. The same electrical speed sensor assembly can also be used to measure the distance the vehicle has traveled by simply keeping track of the number of rotations the shaft 370 has turned as opposed to calculating the number of rotations per unit of time as is needed for speed calculations. An output line 372 from the magnetic sensor 370 is coupled to the vehicle monitoring circuit 70 which receives a digital pulse signal from the magnetic sensor 360 each time the shaft 370 has completed one full rotation. Based on the number of pulses received, the distance the vehicle 32 has traveled can be determined and/or an odometer reading can be appropriately adjusted. It is noted that as an additional feature of this invention the speed of the vehicle 32 at any given time can also be calculated and stored by the vehicle monitoring circuit 70. For instance, if the distance the vehicle 32 travels over any given period of time exceeds a certain threshold value such as 75 mph, this information along with the duration for which it lasted may be stored by the vehicle monitoring circuit 70. The rental agency 40 renting this vehicle 32 to this customer could then wirelessly retrieve this information and possibly charge a fine to the customer for extraordinary wear and tear of the vehicle 32.

Figure 9:
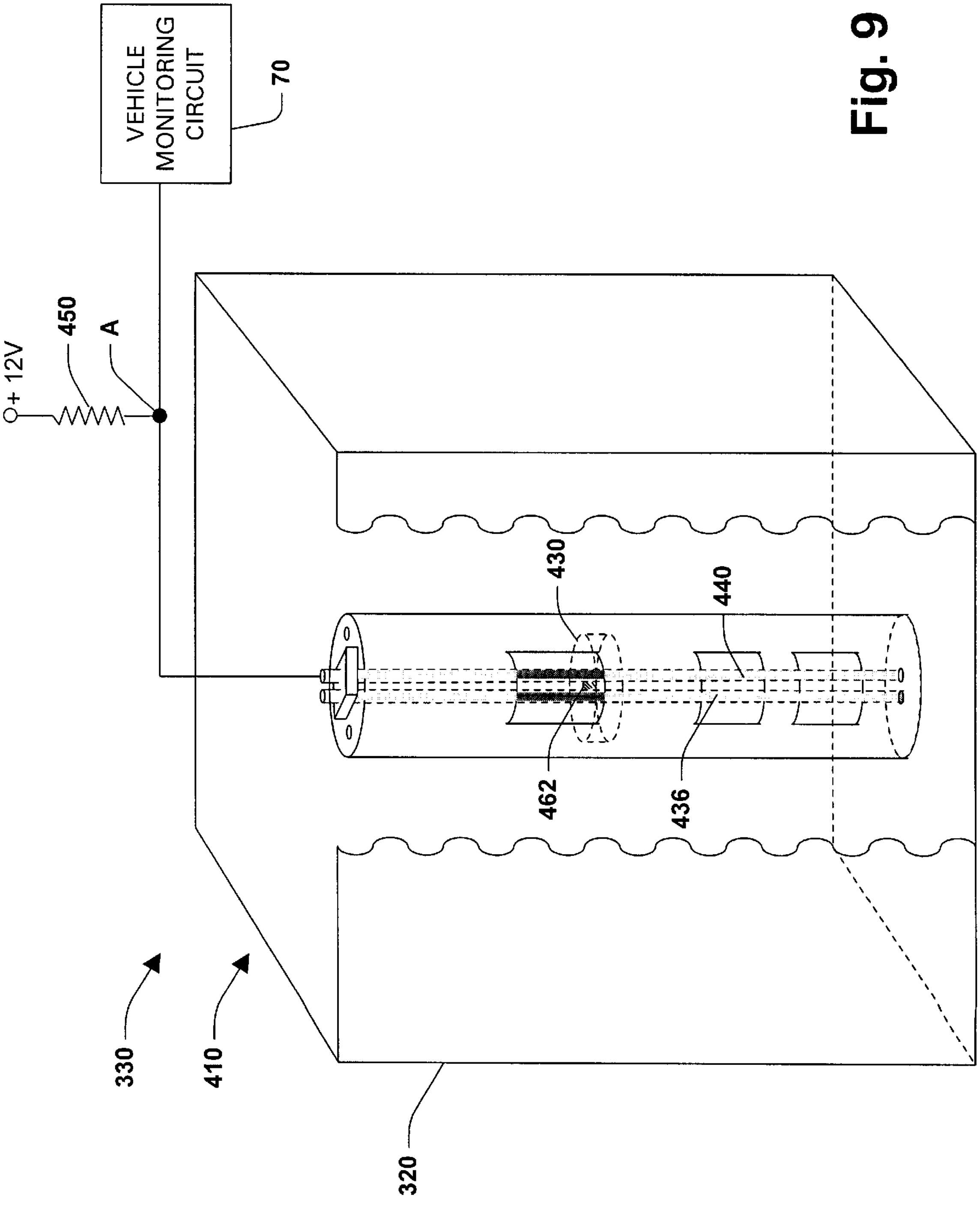
FIG. 9 is a schematic diagram of a fuel level monitoring apparatus coupled to the vehicle monitoring circuit of FIG. 7 in accordance with the present invention.

Turning now to FIG. 9, a fuel level monitoring apparatus and circuit is shown generally at 330. More specifically, a fuel level monitoring apparatus 410 is submerged into the gas tank 320 of the vehicle 32. The fuel level monitoring apparatus 410 consists of a float 430, a pair of rods 436, 440 and a spring tension contact 462 connected to the float 430 and providing a reliable conductive contact between the rods 436, 440 as the float moves up or down in accordance with the current level of liquid in the gas tank 425. In this embodiment, rod 436 is a ground rod while rod 440 is a resistive rod. A fuel level monitoring apparatus of the kind that could be used in conjunction with the present invention is described more fully in U.S. Pat. No. 4,641,523, which is hereby incorporated by reference.

In order to measure the current gas level in the fuel tank 320, a voltage divide circuit is formed from a combination of the pair of rods 436, 440 and a pull up resistor 450. The voltage divide circuit produces a voltage level at node A which is proportional to the fuel level in the gas tank 320 and this analog signal is passed along to the vehicle monitoring circuit 70 via line 460. The pull up resistor 450 has a fixed value which in this embodiment is of the order of 10K and is tied to a positive 12 volt lead from the vehicle battery (not shown). Of course any suitable component values may be employed to carry out the present invention.

The combination of rods 436, 440 serve as a variable resistor which changes resistance based on the location of the float 430 along the resistive rod 440. If the fuel tank 425 is full and the float 430 is towards the top of fuel tank 425, the resistance seen between node A and ground will be relatively small since spring tension contact 460 provides current flowing through the resistive rod 440 with a quick path to the ground rod 436. As fuel is burned up and the float 430 lowers, the path along resistive rod 440 which current must flow through to get to ground increases thereby effectively increasing the resistance seen along this path by node A. Thus, the analog signal sent to the vehicle monitoring circuit 70 along line 460 is proportional to the fuel level in the gas tank 320.

Figure 10:
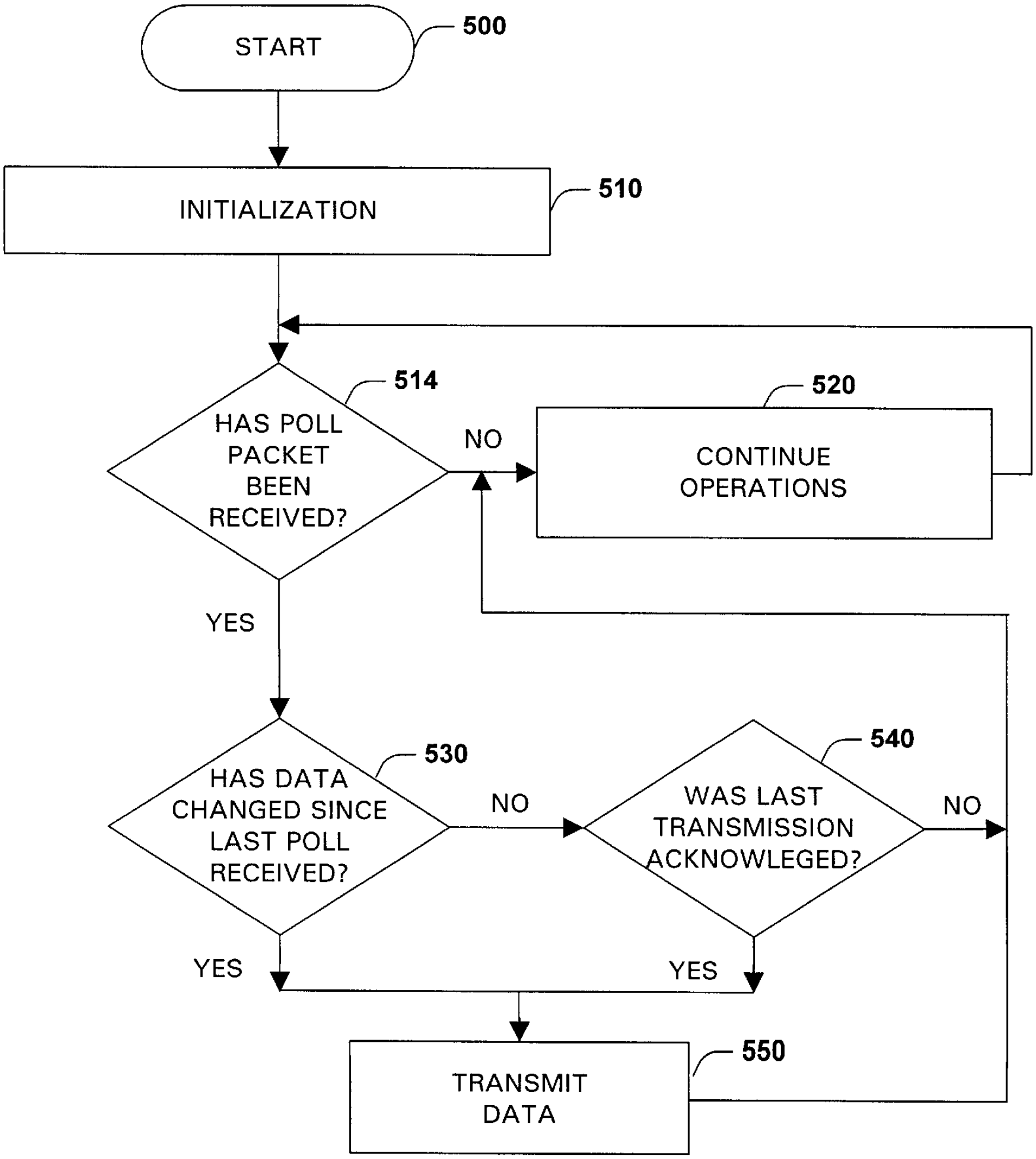
FIG. 10 is a flowchart suitable for programming the operation of a processor of the vehicle monitoring circuit in accordance with the present invention.

Referring now to FIG. 10, the operations of the processor 260 of the vehicle monitoring circuitry 70 is shown. Prior to the processor 260 being installed in each vehicle 32, each processor 260 is preconfigured with specific information related to the vehicle 32 in which the processor 260 is to be installed. The information preconfigured within the processor 260 includes the vehicle identification number (VIN) associated with the vehicle 32 in which it is installed, the current mileage reading on the odometer for the vehicle 32, and any equations or tables needed to interpret and/or convert information obtained related to the fuel level, distance traveled, speed, etc. Following start up at step 500 the processor 260 in step 510 goes through a series of one time initialization steps where the preconfigured information is properly mapped, loaded and stored in memory locations for future use.

Following step 510, the processor 260 continues to step 514 where it waits for a poll packet from the host computer 52 sent via base station 58. As discussed above, the host computer 52 broadcasts intermittent poll packets to determine if a vehicle 32 has recently come into range of the base station 58 indicating that the vehicle 32 is being returned. Such poll packets may be sent from the host computer 52 every 5 seconds, for instance. Thus, the processor 260 continually monitors the receiver 282 of the RF circuitry 270 to determine if such a poll packet has been received. If the poll packet is not received the processor 260 moves to step 520 where it simply continues calculating vehicle status data (e.g., monitoring distance and fuel level) before returning to step 514. If, however, a poll packet is received in step 514, the processor 260 advances to step 530. In step 530, the processor 260 determines if the vehicle status data (e.g., mileage, fuel level, etc.) has changed since the last time the processor 260 successfully transmitted this information. It is beneficial to check if such information has already been transmitted so that a vehicle 32 dropped off in the return area does not continually send repeated information to the host computer 52 for every poll packet the processor 260 receives before being moved out of the return area and into a more permanent parking spot. When checking to see if the data has changed, the processor 260 may be programmed to ignore insignificant changes such as those that might occur when moving a vehicle 32 a short distance on the lot or the like. Thus, for example, the processor 260 may not respond to poll packets if it has not moved at least a half mile since the last time it was polled provided that the fuel level has also not significantly changed.

If in step 530 the processor 260 determines that the data has not substantially changed, the processor 260 goes to step 540 where it determines if an acknowledge from the base station 58 or host computer 52 was received the last time such information was transmitted before concluding that there is no reason to resend such information.

If in step 530 the processor 260 determines that the data has changed substantially, the processor proceeds to step 550 where the data is transmitted to the host computer 52.

In step 540, if an acknowledge was received from the base station 58 or host computer 52, the processor 260 returns to step 520 where it continues normal operations. If, however, such an acknowledgment was not received, the processor 260 continues to step 550. If the data has changed significantly since the last poll packet was received or if an acknowledge was not received the last time this information was transmitted, the processor 260 in step 550 transmits all data it has to the host computer 260. The data is transmitted in packet format as is conventional in the wireless industry and includes either one or both of a unique ID for this processor and/or the VIN number of the vehicle so that the host computer 52 can identify which vehicle the corresponding data is to be associated. Following step 550, the processor 260 continues to step 520.

Upon receiving the data by the host computer 52, one of several options exist. The host computer 52 could calculate the final bill and forward it to one of the in store cash registers 50 for quick check-out by the customer.

Additionally, the host computer 52 could forward this information to the self check out computer 72 on the shuttle bus 42 (see FIG. 1) from which a receipt can also be printed. In the later case, a customer desiring to go to an airport after dropping off a vehicle could immediately board the shuttle bus 30 after parking his/her vehicle in the drop area and completely avoid any delays. Alternatively, the data from the vehicle could have been sent directly from the vehicle 32 to the self check out computer 72 where the receipt is printed without going to the host computer 52. In such a case, transactions completed at the self check out computer 72 would preferably be stored for later retrieval by the host computer 52.

Figure 11:
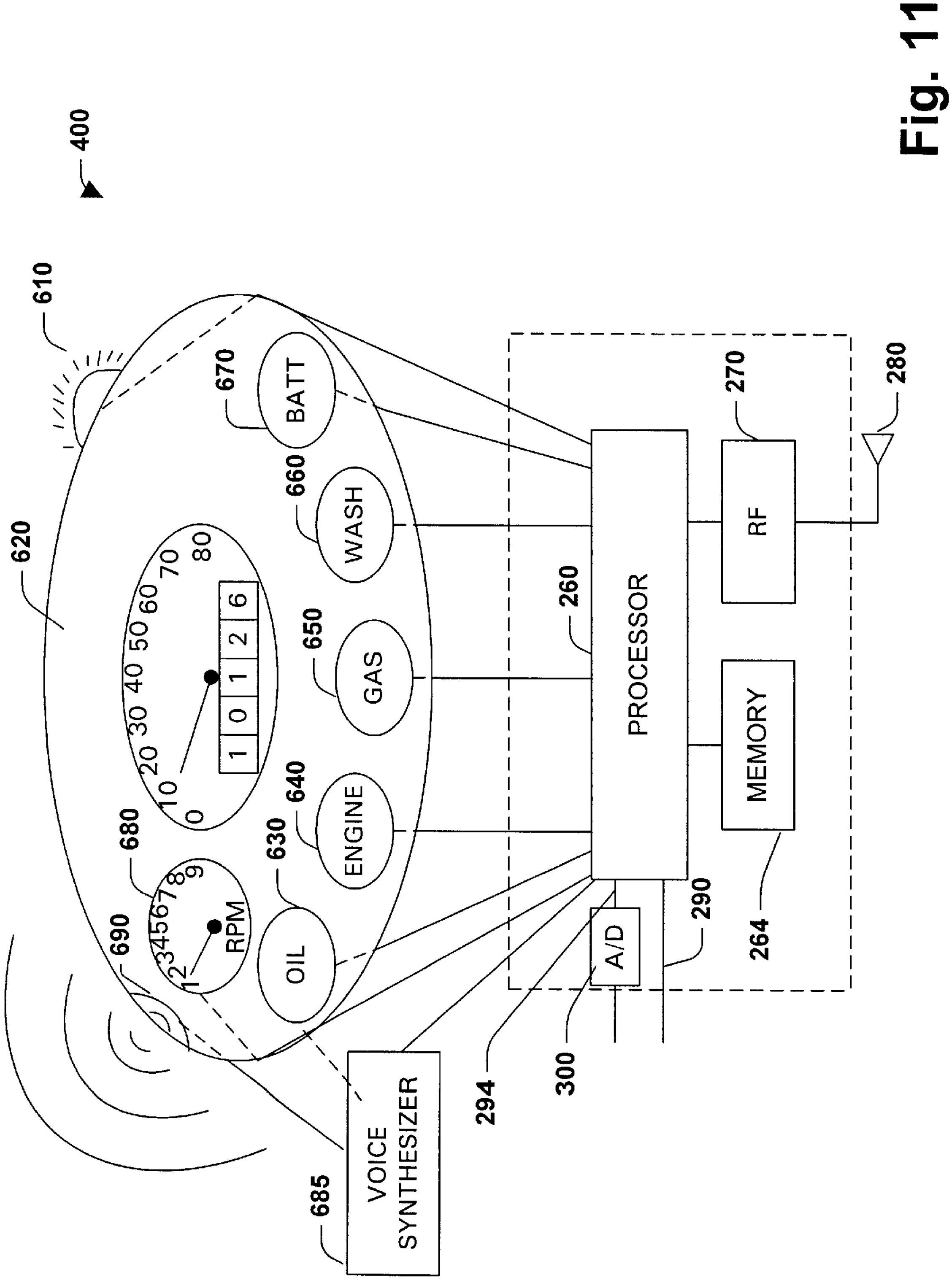
FIG. 11 is schematic diagram of a monitoring circuit tied to a vehicle dash board in accordance with the present invention.

In order to ensure a customer knows his/her vehicle has been properly registered by the host computer 52 prior to entering the bus 42, a light indicator 610 (FIG. 11) inside the vehicle 32 could be turned on upon the processor 260 receiving an acknowledgment that the data it transmitted was properly received and processed by the host computer 52. Alternatively, an electronic sign 80 (FIG. 1) outside the rental agency 40 could display a sign saying "Thank you Mr. XXXX, your drop off has been processed", indicating to the customer that he/she may board the bus 42 without concern as to if the return transaction has been completed. Such an electronic sign 80 could work as conventional electronic signs and be tied directly to the host computer 52. As yet an additional feature, a voice synthesizer chip 685 (see FIG. 11) could be connected to a speaker 690 within the vehicle's existing audio system. The voice synthesizer chip 685 could be used to audibly communicate canned and/or newly generated phrases to the driver indicating the fuel, mileage, total bill and other information prior to the driver exiting the vehicle. Voice chips capable of performing these functions are readily available from several manufacturers and includes voice chip "Accent", manufactured by AICOM of San Jose, Calif. and "IS22C011", manufactured by Integrated Silicon Solutions, Inc. of Santa Clara, Calif. The voice synthesizer chip 685 of the present embodiment is shown coupled to the processor 260 which serves to control what messages are communicated to the driver.

The vehicle monitoring circuitry 70 could also be tied to other features of the vehicle 32 in order to ensure proper maintenance and reliability. For example, referring to FIG. 11, the processor 260 of the vehicle monitoring circuitry 70 could be tied to the emergency lights shown on the vehicle dash board 620. Such light indicators may include, for example, low oil 630, check engine 640, low gas 650, low windshield washer fluid 660, low battery 670, etc. Upon the triggering of any such emergency lights, the processor 260 would store this information along with a time stamp and transmit this information to the host computer 52 at drop off time. Additionally, the processor 260 could also be tied to the rotations per minute (RPM) gauge 680 so as to keep track of the number of times and duration of which the vehicle 32 was placed into dangerous zone by the driver.

Although it is shown in the present embodiment that the processor 260 is responsible for performing calculations interpreting raw data prior to transmitting it to a base station 58 or other device, it will be understood that such calculations could occur on other devices as well. Further, rather than hardcoding the VIN number and mileage onto the processor 260 it is also possible that such information is wirelessly transmitted to the processor 260 once at start up by the host computer 52 or other network device. In such cases, however, each processor 260 would have to have some unique identifiable address so that this information could be specifically directed to this processor 260 without disruption to other vehicle monitoring circuits which may be within listening range.

Thus, an example of the preferred embodiment of the present invention would work as follows. A customer would rent a vehicle 32 from the rental agency 40. The host computer 52 would have pre-rental status information of the vehicle stored in its memory 130. During the rental period, the vehicle monitoring circuit 70 would continuously collect status information relating to the vehicle in the manner described above. Upon returning the vehicle 32, when the vehicle 32 enters a vehicle return zone (corresponding the cell coverage area of the base station 58), the processor 260 of the vehicle monitoring circuit would receive via receiver 282 a signal from the base station 58 which would prompt the processor 260 to finalize the vehicle status information and transmit the data via transmitter 284 to the base station 58. The base station 58 which is hardwired to the network backbone 54 would transmit this data to the host computer 52. The host computer 52 would compare the current vehicle status data to the pre-rental vehicle status data and calculate a final charge for rental of the vehicle 32. The host computer 52 would then transmit the final charge along with an itemization of charges to the cash register 150. The cash register 150 would generate a bill which would be presented to the customer upon his/her entering the rental agency 40 for completion of his vehicle rental transaction. The present invention thus significantly reduces the amount of manpower needed for rapid drop-off of a rented vehicle.

According to another embodiment, rather than the host computer 52 sending the final charge information to the cash register 150, the final charge could be wirelessly transmitted via the base station 58 to the bus 42. The customer could thus simply park the returned rental vehicle in the return area and proceed directly to the bus 42. The computer 72 of the bus could generate a final bill based on the wirelessly transmitted information it received from the host computer 52. The computer 72 on the bus 42 could be coupled to a printer (not shown) which could print out a final bill for the customer. Since most vehicle rentals are reserved by charge card, the computer 72 could apply the charges directly to the charge card, and simply print out a receipt for the customer upon his entering the bus. This embodiment of the present invention further reduces transaction time for the customer since he/she would not have to enter the rental agency to complete the rental transaction.

Figure 12:
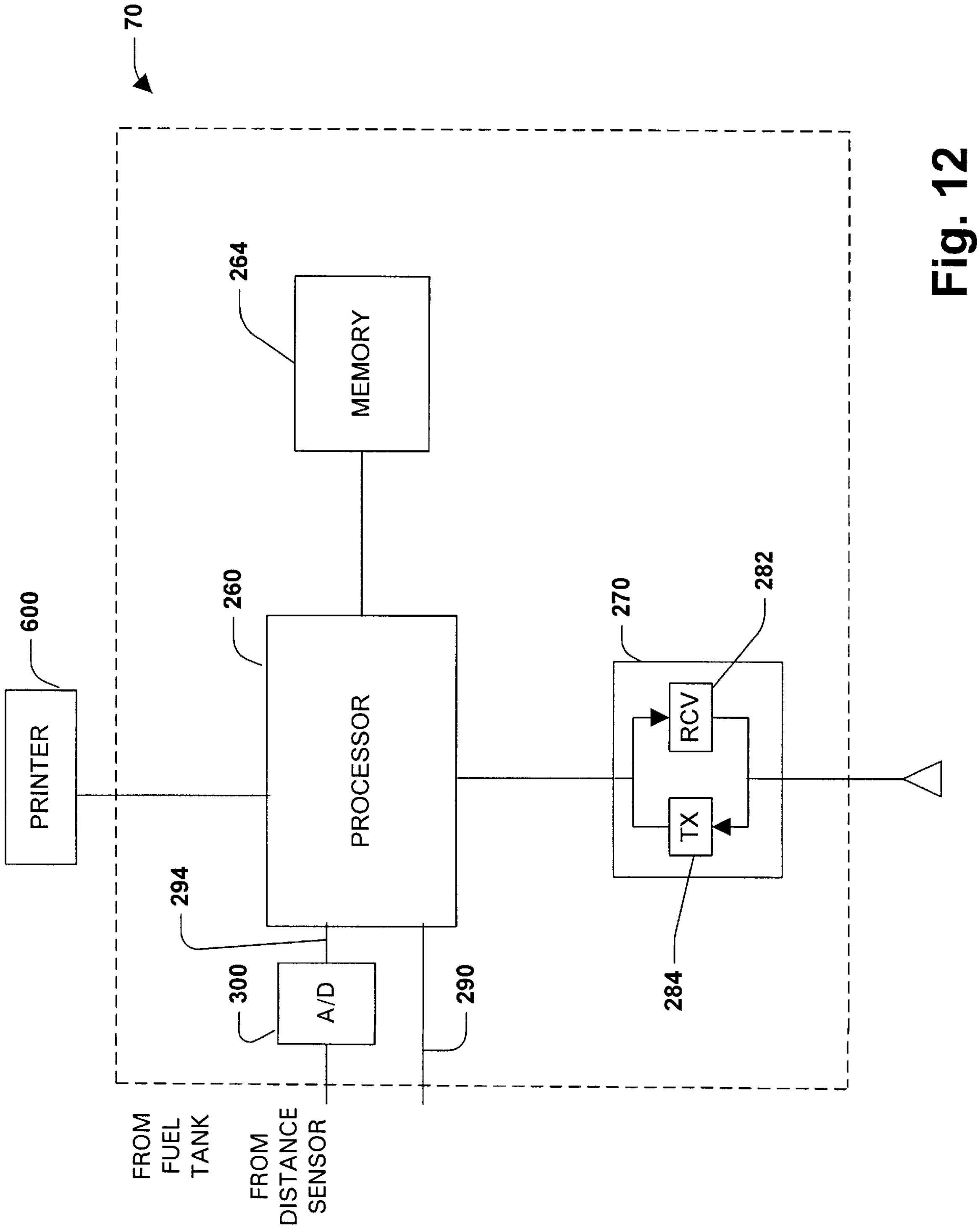
FIG. 12 is block diagram of the vehicle monitoring circuit of FIG. 7 coupled to a printer in accordance with one aspect of the present invention.

It will be appreciated that other variations of the present invention are possible and fall within the scope of the present invention. For example, according to another aspect of the present invention as shown in FIG. 12, the vehicle 32 can be designed to be more autonomous. In particular, the base station 58 can be designed to emit a signal within its zone such that when a vehicle 32 enters the zone, the vehicle monitoring circuit 70 is triggered to generate a bill for the customer. The vehicle monitoring circuit 70 may have all of the vehicle status information already stored in its memory 264. The processor 260 can be preprogrammed with charge routines to generate a final charge for rental of the vehicle 32 based on the vehicle status information.

The charges would be based on fuel level of the returned vehicle, mileage used during the rental period, time the vehicle was returned, excess wear and tear on the vehicle, etc. Typically, the customer reserves the vehicle 32 with a charge card. The charge card information can be transmitted to the vehicle 32, in accordance with the procedure described above for transmitting information, prior to the customer picking the vehicle up. The charge card information may be stored in the memory 264. Thus when the vehicle 32 is returned and enters the zone of the base station 58, a final charge can be generated based on the vehicle status information. The final charge can be applied to the customer's charge card. A printer 600 can be coupled to the processor 260 and print out a receipt for the customer. In this manner, the vehicle 32 is more autonomous with respect to vehicle return system of the present invention. This aspect of the present invention also avoids the need for the customer to have to enter the rental agency 40 to complete his/her rental transaction.

According to another aspect of the present invention, a base station 58 is not present, but rather the host computer 60 includes an RF section similar to that of the base station 58. Thus, with respect to this aspect of the invention, the host computer 52 wirelessly communicates with the vehicle 32 and bus 42 in any of the manners described above. The host computer 52 thus would serve the functions of the above-described base station 58 as well as the functions described above of the host computer 52.

In accordance with still another aspect of the present invention, the vehicle monitoring circuit 70 could be coupled to an on-board computer (not shown) of the vehicle 32. It is known that several brands of vehicles include on-board computers which collect data such as fuel level, speed, mileage, etc. to be displayed to the user of the vehicle. In this regard, the vehicle monitoring circuit 70 could obtain such data directly from the on-board computer, and then carry out the functions described above in connection with generating a final charge for the rental of the vehicle 32.

There are numerous iterations and combinations of the devices employed in the present system 30 all of which fall within the scope of the present invention. The present invention includes all such equivalents and modifications, and is limited only by the scope of the following claims.

What is claimed is:

1. An automated vehicle return system, comprising:

a vehicle including vehicle monitoring circuitry for monitoring parameters relating to the status of the vehicle;

a wireless transmitter which may be coupled to the vehicle, the transmitter operative to transmit data relating to the status of the vehicle; and at least one base station positioned within a geographic region representing a vehicle return zone, the at least one base station including a receiver for receiving the data transmitted by the vehicle when the vehicle enters the vehicle return zone, the at least one base station transmitting a polling signal within the vehicle return zone to trigger the vehicle monitoring circuitry to transmit the vehicle status data;

wherein the at least one base station forwards the received data to a host computer which is operative to process the data.

2. The automated vehicle return system of claim 1, wherein the vehicle further includes voice circuitry for audibly communicating at least a portion of the data relating to the status of the vehicle.

3. The automated vehicle return system of claim 1, wherein the data includes vehicle mileage data.

4. The automated vehicle return system of claim 1, wherein the data includes vehicle fuel data.

5. The automated vehicle return system of claim 1, wherein the data includes time data relating to the time the vehicle was returned.

6. The automated vehicle return system of claim 1, wherein the vehicle monitoring circuitry is tied to components within the vehicle, the monitoring circuitry being operative to collect the data relating to the vehicle from the respective components.

7. The automated vehicle return system of claim 6, wherein the components within the vehicle include at least one of a fuel gauge, an odometer, and a speedometer.

8. The automated vehicle return system of claim 3, wherein the vehicle includes a vehicle mileage assembly operative to measure vehicle mileage, the vehicle monitoring circuitry being tied to the vehicle mileage assembly, the vehicle monitoring circuitry being operative to collect data relating to vehicle mileage.

9. The automated vehicle return system of claim 4, wherein the vehicle includes a fuel gauge assembly operative to measure vehicle fuel level, the vehicle monitoring circuitry being tied to the fuel gauge assembly, the vehicle monitoring circuitry being operative to collect data relating to vehicle fuel level.

10. The automated vehicle return system of claim 1, wherein the host computer polls the vehicle via the at least one base station at predetermined intervals.

11. A vehicle monitoring circuit, comprising:

a processor;

a memory coupled to the processor;

an RF circuit coupled to the processor, the RF circuit including a transceiver for transmitting and receiving wireless communication;

wherein the vehicle monitoring circuit is coupled to vehicle components, the vehicle monitoring circuit operative to collect vehicle data via the vehicle components and wirelessly transmit the vehicle data to a destination device upon being polled by the destination device within a vehicle return zone.

12. The vehicle monitoring circuit of claim 11, wherein the monitoring circuit is tied to a speed sensor assembly of the vehicle, the monitoring circuit being operative to collect data from the speed sensor assembly relating to vehicle speed.

13. The vehicle monitoring circuit of claim 11, wherein the monitoring circuit is tied to a vehicle mileage assembly of the vehicle, the monitoring circuit being operative to collect data from the vehicle mileage assembly relating to vehicle mileage.

14. The vehicle monitoring circuit of claim 11, wherein the monitoring circuit is tied to a vehicle fuel level assembly of the vehicle, the monitoring circuit being operative to collect data from the vehicle fuel level assembly relating to vehicle fuel level.

15. A method of returning a rented vehicle, comprising the steps of:

driving the vehicle to a predetermined location;

using vehicle monitoring circuitry engaged with the vehicle to assimilate data relating to the vehicle;

using a base station to operatively poll the vehicle monitoring circuitry upon entry into a vehicle return zone;

using the vehicle monitoring circuitry to wirelessly transmit the data relating to the vehicle to the base station;

forwarding the vehicle data to a host computer; and processing the vehicle data.

16. The method of claim 15, further including the step of determining a rental charge for the vehicle based on the processed vehicle data.

17. The method of claim 15, wherein the step of using the vehicle monitoring circuitry engaged with the vehicle to assimilate data relating to the vehicle includes assimilating data relating to vehicle mileage.

18. The method of claim 15, wherein the step of using the vehicle monitoring circuitry engaged with the vehicle to assimilate data relating to the vehicle includes assimilating data relating to vehicle fuel level.

19. The method of claim 15, wherein the step of using the vehicle monitoring circuitry engaged with the vehicle to assimilate data relating to the vehicle includes assimilating data relating to vehicle speed.

20. An automated vehicle return system, comprising:

a vehicle including a system for monitoring operating parameters of the vehicle;

a wireless transmitter which may be coupled to the vehicle, the transmitter operative to transmit data relating to the status of the vehicle; and at least one host computer positioned within a geographic region representing a vehicle return zone, the at least one host computer including a receiver for receiving the data transmitted by the vehicle when the vehicle enters the vehicle return zone;

wherein the at least one host computer is operative to poll the monitoring system when the vehicle enters the vehicle return zone to prompt the monitoring system to transmit the vehicle status data, the host computer further operative to process the data.

21. The automated vehicle return system of claim 20, wherein the vehicle further includes voice circuitry for audibly communicating at least a portion of the data relating to the status of the vehicle.

22. The automated vehicle return system of claim 20, wherein the vehicle further includes speed monitoring circuitry for monitoring the speeds at which the vehicle was driven.

23. The automated vehicle return system of claim 22, wherein the vehicle includes a vehicle mileage assembly operative to measure vehicle mileage, the vehicle monitoring system being tied to the vehicle mileage assembly, the monitoring system being operative to collect data relating to vehicle mileage.

24. The automated vehicle return system of claim 20, wherein the data includes vehicle fuel data.

25. The automated vehicle return system of claim 20, wherein the data includes time data relating to the time the vehicle was returned.

26. The automated vehicle return system of claim 25, wherein the components within the vehicle include at least one of a fuel gauge, an odometer, and a speedometer.

27. The automated vehicle return system of claim 20, wherein the monitoring system is tied to components within the vehicle, the monitoring system being operative to collect the data relating to the vehicle from the respective components.

28. The automated vehicle return system of claim 23, wherein the vehicle includes a fuel gauge assembly operative to measure vehicle fuel level, the vehicle monitoring system being tied to the fuel gauge assembly, the monitoring system being operative to collect data relating to vehicle fuel level.

29. The automated vehicle return system of claim 20, wherein the host computer polls the vehicle monitoring system via at least one base station at predetermined intervals.

30. An automated vehicle return system, comprising:

a vehicle including vehicle monitoring circuitry for monitoring the status of the vehicle;

a first transmitter coupled to the vehicle, the first transmitter operative to wirelessly transmit data relating to the status of the vehicle; and at least one base station positioned within a geographical region representing a vehicle return zone, the at least one base station operative to poll the vehicle to prompt the vehicle monitoring circuitry to transmit the data, and the at least one base station operative to receive the data transmitted by the first transmitter when the vehicle is within the vehicle return zone;

wherein the at least one base station is coupled to a vehicle return processing device which is operative to process the data.

31. The automated vehicle return system of claim 30 wherein the vehicle return processing device is a host computer.

32. The automated vehicle return system of claim 30 wherein the vehicle return processing device is included within a second vehicle.

33. The automated vehicle return system of claim 32 wherein the second vehicle is a shuttle bus.

34. The automated vehicle return system of claim 33 wherein the vehicle return processing device is capable of printing a receipt based on the data processed.

35. The automated vehicle return system of claim 30 wherein the data relating to the status of the vehicle includes data relating to mileage.

36. The automated vehicle return system of claim 35 wherein the data relating to the status of the vehicle further includes data relating to fuel level.

37. The automated vehicle return system of claim 30 wherein the data relating to the status of the vehicle includes data relating to fuel level.

38. The automated vehicle return system of claim 30 wherein the vehicle further includes a wireless vehicle receiver.

39. The automated vehicle return system of claim 38 wherein the first transmitter transmits the data relating to the status of the vehicle upon the vehicle receiver receiving a status update request signal while the vehicle is within the vehicle return zone.

40. A vehicle return system, comprising:

a vehicle, comprising:

means for monitoring the status of a vehicle;

means for detecting when the vehicle has entered a vehicle return zone;

means for analyzing data relating to the status of the vehicle;

means for determining a fee to charge a user based on the status of the vehicle; and means for printing a bill for the fee.

41. The vehicle return system of claim 40 further including means for receiving wireless communications.

42. The vehicle return system of claim 40 further comprising means for audibly communicating information related to the status of the vehicle.

43. An automated vehicle return system, comprising:

a vehicle including vehicle monitoring circuitry for monitoring the status of the vehicle;

a base station for transmitting a prompting signal within a vehicle return zone;

wherein the vehicle monitoring circuit receives the prompting signal upon entering the vehicle return zone and generates a vehicle rental charge based on the vehicle status.

44. The automated return system of claim 43 wherein the vehicle monitoring circuit processes status information relating to the vehicle upon receiving the prompting signal.

45. The automated vehicle return system of claim 44 wherein the vehicle monitoring circuit is coupled to a printer which prints the charge for rental of the vehicle.

46. The automated vehicle return system of claim 45 wherein the vehicle monitoring circuit charges a customer charge card number based on the determined charge for rental of the vehicle.

47. The automated vehicle return system of claim 44 further including an on-board computer in the vehicle, the on-board computer being coupled to the vehicle monitoring circuit, the on-board computer being operative to provide the vehicle status information to the vehicle monitoring circuit.

* * * * *